UNITED STATES PATENT OFFICE.

CHARLES C. HALEY, OF TROY, NEW YORK.

IMPROVEMENT IN THE MANUFACTURE OF BEER.

Specification forming part of Letters Patent No. 132,574, dated October 29, 1872.

*To all whom it may concern:*

Be it known that I, CHARLES C. HALEY, of Troy, New York, have invented an Improvement in the Manufacture of Beer, of which the following is a specification:

This invention consists in a compound of the ingredients hereinafter named, used in the manner and in the proportions substantially as described, to form an improved beverage which I have denominated "California Pop Beer."

In the manufacture of beer according to my invention, I first prepare the yeast as follows: For one hundred and five gallons of beer, I take of wheat flour three-quarters of a pound and dissolve it in one quart of cold water, and one ounce of hops steeped one hour in two quarts of water, and afterward strained. The dissolved wheat flour and the steeped hops are then mixed together, and the mixture is steeped for half an hour. It is then allowed to cool to the temperature of 88° Fahrenheit, after which three ounces of ground malt and one-half an ounce of pure spirits are added, and the mixture allowed to stand for twelve hours.

The essence is next prepared as follows: To five ounces of alcohol I add one-half an ounce of oil of winter-green, one-third of an ounce of oil of sassafras, and one-third of an ounce of oil of spruce, and these ingredients are thoroughly mixed.

The yeast and essence having been thus prepared, the manufacture of the beer is proceeded with as follows: I take one-half a pound of hops, fourteen ounces of chemically-prepared cream of tartar, and one-half pound of African ginger-root. These are placed in a suitable tub and steeped with ten gallons of water one hour, after which seventy pounds of granulated sugar are added. The essence prepared as above stated is now added to the mixture in the tub, and the contents are brought to a heat of about 90°; and, at this point, the yeast first prepared is poured in and the mixture allowed to stand for four hours. It is then bottled, and after standing for three days it is ready for use. The beer thus prepared is a superior and harmless beverage.

Having thus described my invention, what I claim as new, and desire to secure by Letters Patent, is—

The manufacture of beer of the ingredients used in the proportions and compounded substantially as herein described.

CHAS. C. HALEY.

Witnesses:
W. H. FINCKEL,
GEO. W. ROTHWELL.